Oct. 21, 1952 C. ACKERMAN 2,614,321
SAFETY RAZOR
Filed Dec. 23, 1950
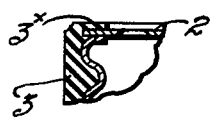
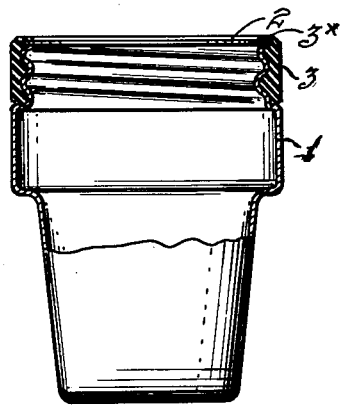
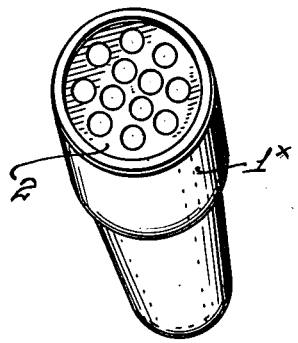
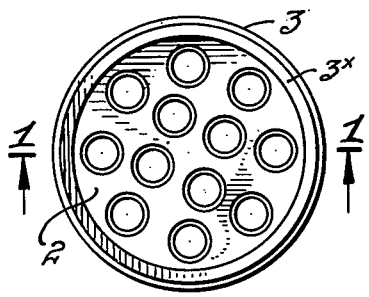
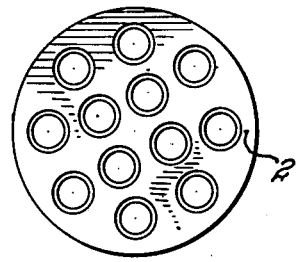
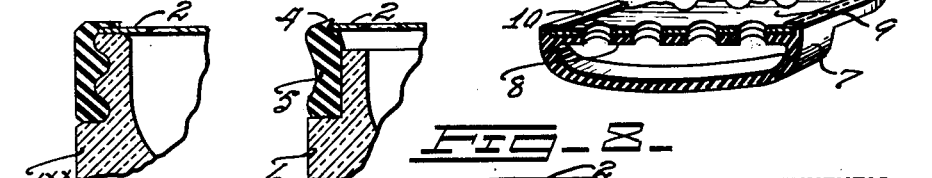
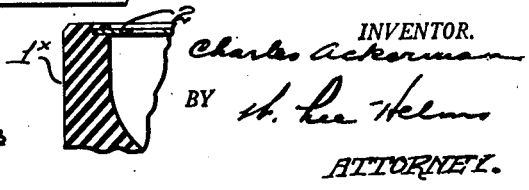
INVENTOR.
Charles Ackerman
BY H. Lee Helms
ATTORNEY.

Patented Oct. 21, 1952

2,614,321

UNITED STATES PATENT OFFICE 2,614,321

SAFETY RAZOR

Charles Ackerman, Hackensack, N. J.

Application December 23, 1950, Serial No. 202,513

1 Claim. (Cl. 30—34)

The present invention relates to that type of safety razor employing a fixed blade, the latter being removable for replacement with a new blade. The object of the invention is to provide a novel type of holder and blade which will be particularly adaptable for a "dry" or soapless shave, which will have a shaving action with improved closeness of shave without cutting the skin of the user, which will have a greatly enlarged cutting edge area commensurate with the over-all area of the blade, and which, in a preferred form of the invention, will provide a yielding carrying area for the blade which area may include surfaces disposed marginally of the blade and which have immediate contact with the skin to have a smoothing and straightening action upon the skin forwardly of the cutting action. By reason of the invention it is almost impossible to cut the skin in all normal operations of the razor.

The above and further objects of the invention will be described with reference to the drawings, in which:

Fig. 1 is an elevation, partly broken away, and illustrating an embodiment of the invention, the blade not being in section, and Fig. 1A is a fragmentary enlargement thereof.

Fig. 2 is a top plan view of the structure shown in the preceding figure, the blade being shown with its annular apertures edge-sharpened at their tops.

Fig. 3 is a perspective view of the structure shown in Fig. 8 the blade having been sharpened in the manner shown in Fig. 9 at the right hand portion of that figure.

Fig. 4 is a top plan view of the blade shown in Fig. 2.

Fig. 5 is a fragmentary view in perspective of a modified structure.

Fig. 6 is a fragmentary view in vertical section showing a modified form of blade holder.

Fig. 7 is a fragmentary view in vertical section showing an additional form of holder for the blade.

Fig. 8 is a view similar to that of the preceding figure showing the holder made entirely of molded rubber.

Fig. 9 is an enlarged view of the blade, in transverse section and broken away at its center, dotted lines showing that the margin of a perforation has been deflected upwardly and then ground away in the top plane of the blade to form a sharp cutting edge.

The blade may be of any desired marginal outline, and for simplicity I prefer that it be round or oval. This enables an exceedingly simple way of assembling the blade in its holder and also quickly removing the same for replacement. For such purpose the entire blade holder, or only its blade holding overhang area, may be made of elastic material, rubber being suitable, so that the top peripheral margin of the holder may be formed as a lip which can be flexed over upon the top of the blade, thus holding it in position upon a suitable underlying supporting surface.

In the blade holder of Figs. 1, 2, and 6, the holder is shown as formed of suitable material, such as plastic or metal, and as a hollow shell closed at its lower end. It has a cylindrical upper portion 1 reduced and threaded near its top to receive an interiorly threaded cap or rubber or other suitably yielding material. The top of the shell is open and serves as a supporting base for the blade 2. The cap is open at its top except for a narrow inwardly projecting lip which overhangs the blade and holds it firmly on its base or seat. When the cap is made of rubber the blade may be placed in approximate position and the lip flexed over the margin of the blade. The blade may be laid on its seat and the threaded cap applied to the holder thereafter. The cap is indicated at 3 and its lip at $3^x$. If desired the cap may be made of metal with a very thin lip, but I prefer that the cap be made of yielding material such as rubber.

The entire blade holder may be made of molded rubber having a relatively thin flexible blade holding lip, as indicated in Fig. 3, wherein the holder is shown at $1^x$. As a modification, however, the holder may be made of rigid material to receive a flexible cap as shown in Figs. 6 and 7. In Fig. 6 the holder $1^{xx}$ is outwardly threaded at its upper area to receive the rubber cap 3 of Figs. 1 and $1^a$. In Fig. 7 the holder is of rigid material but has a friction engagement with the rubber cap which is formed with a blade seat above the rim of the holder, which seat co-acts with a wedge-like blade holding lip 4, the cap itself being indicated at 5, and the holder at 6.

When the holder is made of molded material that area which lies under the blade may be cupped, the remaining part of the holder being solid, if desired.

In Fig. 5, I have illustrated a modification which is shown in that figure by a transverse vertical section and by being broken away toward its far end. This said modification will be in the form of a mitten having a strap at 7. On the far side of the strap is a flat and perforated support 8 for the blade 9, this support 8 at its margins being inturned to provide a blade-holding lip at 10. The user's hand may be slipped under the strap with the palm engaging the blade support 8 and the blade then being wiped over the area to be shaved.

As stated in the foregoing part of this specification, the blade with its multiple edge-sharpened edges, may be very economically formed by multiple punches having shouldered areas adjacent the punch faces which adjacent areas deflect the margins of the holes of the blades as indicated by the dotted lines 11, Fig. 9. Then all of the projecting surfaces 11, are ground down to the plane of the blade, thus forming sharp cutting edges projecting inwardly of each blade holder, and the sharpness may be increased by machine honing and stropping in the usual way. While the manner of forming sharpened edges at the blade holders is preferably that just described, because it enables low cost of manufacture and the formation of the cutting edges substantially in the face planes of the blades, other sharpening procedures may be followed. Thus, as indicated in Figs. 2 and 4, the edges of the blade holders may be sharpened by a plurality of grinding disks simultaneously rotated by a common drive. Machines for multi-driving closely related spindles which spindles ordinarily carry drills, are well adapted for operation of the small grinding and stropping disks which would be employed in sharpening blades of the said Figs. 2 and 4.

In any of the forms of the invention, the blade may be moved by the holder in sweeping strokes, the cutting action being in all directions of such strokes, and I have found that combined sweeping and oscillating motion of the holder as very effective. In the preferred form of the holder, its yielding peripheral margin serves to position the skin for the face shaving action of the blade and also to serve as a massaging implement. As hereinbefore stated, the device is fully operative in shaving without soap, and a close shave is secured thereby.

Although the holes bounded by sharpened edges of the blade are shown in the drawings as round in form, the form may be widely varied.

Having described my invention what I claim and wish to secure by Letters Patent, is as follows:

A safety razor consisting in combination, of a plane surfaced blade formed with a plurality of apertures within its margins the blade at the edges of the apertures being sharpened, and a holder having a marginal seat adapted to receive and support the blade at the margins thereof, the holder including releasable means overlying the seat of the holder for engaging the blade and co-acting with said seat in holding the blade against said seat, in which at least the marginal seat area of the holder is formed of molded non-hard rubber, the holder having a handle area and a dished top formation, bounded by a flat seat for the blade, the releasable means being a flexible lip above said seat which lip is adapted to overlie the blade when the latter rests upon the seat.

CHARLES ACKERMAN.

REFERENCES CITED

The following references are of record in the file of this patent:

UNITED STATES PATENTS

| Number | Name | Date |
|---|---|---|
| 1,159,647 | Bruecker | Nov. 9, 1915 |
| 2,040,599 | Davies | May 12, 1936 |
| 2,119,021 | Moskovics | May 31, 1938 |
| 2,291,852 | Weatherford | Aug. 4, 1942 |
| 2,359,584 | Roehner | Oct. 3, 1944 |